US010183532B2

(12) United States Patent
Matsunami et al.

(10) Patent No.: US 10,183,532 B2
(45) Date of Patent: Jan. 22, 2019

(54) MOTORCYCLE TIRE

(71) Applicant: Sumitomo Rubber Industries, Ltd., Kobe-shi, Hyogo (JP)

(72) Inventors: Toshiyuki Matsunami, Kobe (JP); Yumiko Yoshida, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 771 days.

(21) Appl. No.: 14/230,062

(22) Filed: Mar. 31, 2014

(65) Prior Publication Data

US 2014/0305560 A1 Oct. 16, 2014

(30) Foreign Application Priority Data

Apr. 11, 2013 (JP) ................................. 2013-083219

(51) Int. Cl.
*B60C 11/117* (2006.01)
*B60C 11/03* (2006.01)

(52) U.S. Cl.
CPC ........ *B60C 11/0302* (2013.01); *B60C 11/033* (2013.01); *B60C 2011/0344* (2013.01); *B60C 2011/0374* (2013.01); *B60C 2011/0376* (2013.01); *B60C 2011/0381* (2013.01); *B60C 2200/10* (2013.01)

(58) Field of Classification Search
CPC ............. B60C 2200/10; B60C 11/0302; B60C 11/033; B60C 11/032; B60C 2011/0374; B60C 2011/0376; B60C 2011/0381; B60C 2011/0344
USPC ......... 152/209.11, 209.28, 209.17; D12/534, D12/535, 569, 570
See application file for complete search history.

(56) References Cited

U.S. PATENT DOCUMENTS

| | | | | |
|---|---|---|---|---|
| 6,276,415 B1 * | 8/2001 | Nakamura | ................ | B60C 9/22 152/209.11 |
| D619,956 S * | 7/2010 | Hayashi | ....................... | D12/535 |
| 2010/0126645 A1 * | 5/2010 | Barboza | .............. | B60C 11/0302 152/209.11 |

FOREIGN PATENT DOCUMENTS

| | | | | |
|---|---|---|---|---|
| EP | 2468534 A1 * | 6/2012 | ......... | B60C 11/0302 |
| GB | 2114069 A * | 8/1983 | ........... | B60C 11/032 |
| JP | 05201207 A * | 8/1993 | ............. | B60C 11/04 |

(Continued)

OTHER PUBLICATIONS

Machine translation of JP11-291715 (no date).*
Machine translation of JP05-201207 (no date).*

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A motorcycle tire includes a tread portion having a designated rotational direction, the tread portion provided with first inclined grooves extending from a central region to a shoulder region, and second inclined grooves extending from a middle region to the shoulder region. Each first inclined groove includes a first tapered portion, and each second inclined groove includes a second tapered portion. In a pair of the first and second inclined grooves that are arranged closest to each other, the second tapered portion is located behind a forward of the first tapered portion such that a straight line connecting between a forward of the second tapered portion and a backward of the first tapered portion has an angle of from 85 to 90 degrees with respect to a circumferential direction of the tire.

12 Claims, 4 Drawing Sheets

(56) References Cited

FOREIGN PATENT DOCUMENTS

JP 10-297218 A 11/1998
JP 11291715 A * 10/1999 ............. B60C 11/04

* cited by examiner

MOTORCYCLE TIRE

BACKGROUND OF THE INVENTION

Field of the Invention

The present invention relates to a motorcycle tire that may exhibit better performance with respect to ride comfort and wear resistance.

Description of the Related Art

Japanese Unexamined Patent application Publication No. 10-297218 discloses a motorcycle tire that includes a tread portion provided with a plurality of inclined groove with respect to a circumferential direction of the tire. The inclined grooves may be adjusted in small widths or lengths so that the tread portion has a high land ratio to improve its wear resistance.

However, since the motorcycle tire tends to have high spring constant, it may exhibit an uncomfortable ride.

SUMMARY OF THE INVENTION

The present invention has been worked out in the light of the circumstances described above, and has a main object of providing a motorcycle tire that may exhibit better performance with respect to ride comfort and wear resistance.

According to one aspect of the present invention, a motorcycle tire includes a tread portion having a designated rotational direction. The tread portion includes a central region having its center on a tire equator and having a developed width of one third of a tread developed width, a pair of shoulder regions each having a developed width of one sixth of the tread developed width from a tread edge, and a pair of middle regions each between the central region and the middle region. The tread portion is provided with a plurality of first inclined grooves each extending from the central region to the shoulder region, and a plurality of second inclined grooves each extending from the middle region to the shoulder region between circumferentially adjacent first inclined grooves. Each first inclined groove includes a main portion, and a first tapered portion having a groove width decreasing toward the rotational direction of the tire, and each second inclined groove includes a second tapered portion having a groove width decreasing toward the rotational direction of the tire. In a pair of the first and second inclined grooves that are arranged closest to each other, the second tapered portion is located behind a forward of the first tapered portion in the rotational direction of the tire such that a straight line connecting between a forward of the second tapered portion and a backward of the first tapered portion has an angle in a range of from 85 to 90 degrees with respect to a circumferential direction of the tire.

In another aspect of the present invention, the first inclined grooves may extend beyond the tread edge.

In another aspect of the present invention, the central region, the middle region, and the shoulder region have land ratios of Rc, Rm and Rs, respectively, and the land ratios may satisfy the following relation:

Rs>Rm>Rc.

In another aspect of the present invention, the central region, the middle region, and the shoulder region have land ratios of Rc, Rm and Rs, respectively, and the land ratios Rc, Rm and Rs may be set in a range of from 0.8 to 0.9.

In another aspect of the present invention, the first tapered portion of the first inclined groove may have a length larger than a maximum groove width of the first tapered portion, and the second tapered portion of the second inclined groove may have a length larger than a maximum groove width of the second tapered portion.

In another aspect of the present invention, the first inclined grooves may include a left first inclined groove, and a right first inclined groove, each having the first tapered portion in the vicinity of the tire equator, and the tread portion may be further provided with a circumferentially extending central longitudinal groove disposed between the left first inclined groove and the right first inclined groove.

In another aspect of the present invention, a tread pattern of the tread portion may include a left pattern, and a right pattern, the left pattern may have a symmetrical design of the right pattern with respect to the tire equator, and the left pattern may be arranged to be shifted with respect to the right pattern in a circumferential length of the tire.

DETAILED DESCRIPTION

An embodiment of the present invention will be explained below with reference to the accompanying drawings.

Figure 1:
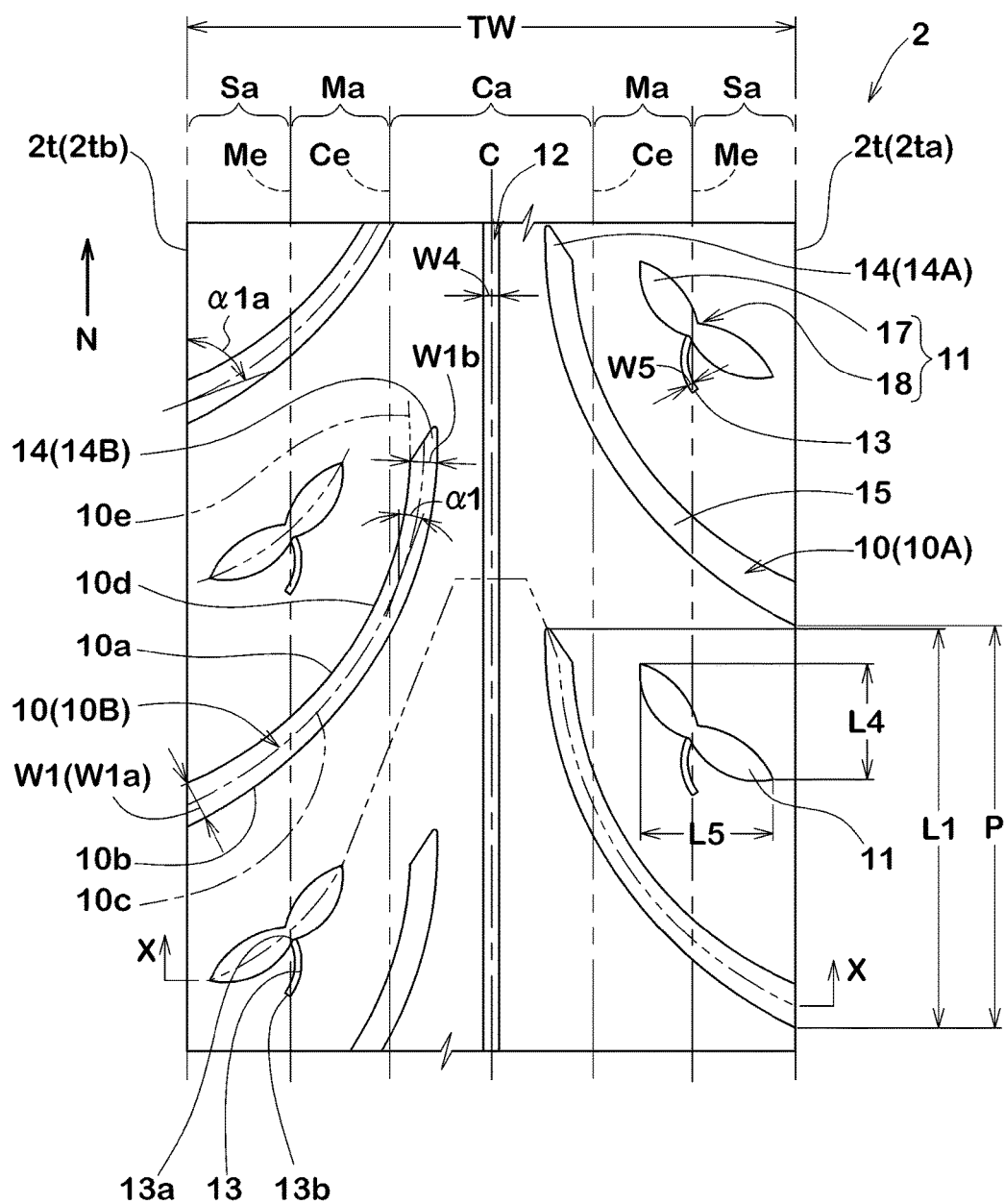
FIG. 1 is a development view illustrating a tread portion of a motorcycle tire in accordance with an embodiment of the present invention.
Figure 2:
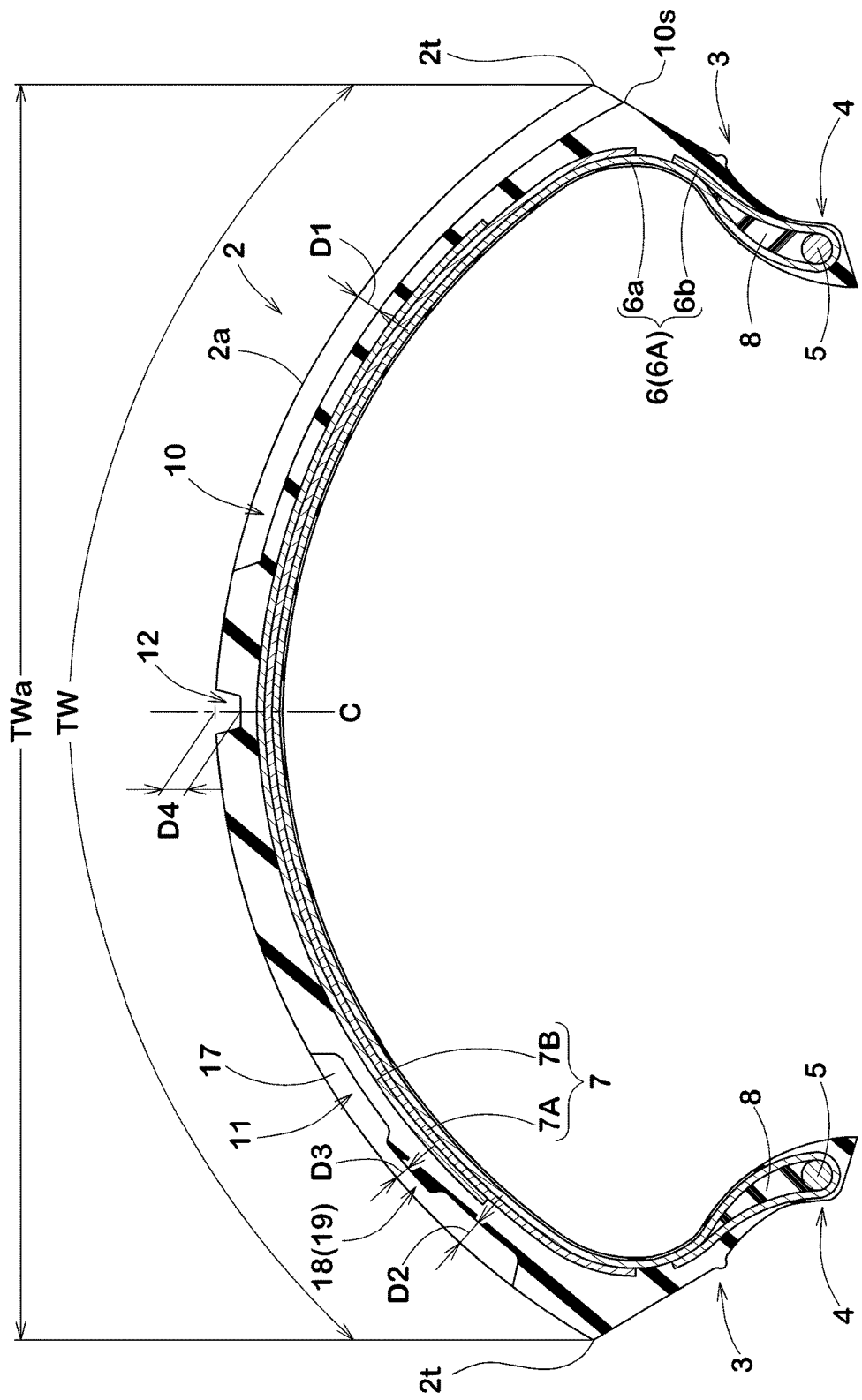
FIG. 2 is a cross-sectional view taken along a line X-X of FIG. 1.

FIG. 1 is a development view illustrating a tread portion 2 of a motorcycle tire in accordance with an embodiment of the present invention, and FIG. 2 is a cross-sectional view taken along a line X-X of FIG. 1. In this application including specification and claims, various dimensions, positions and the like of the tire refer to those under a standard condition of the tire unless otherwise noted. The standard condition is such that the tire 1 is mounted on a standard wheel rim with the standard pressure and is loaded with no tire load.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at Various Cold Inflation Pressures" table in TRA or the like.

The tire in accordance with the present embodiment has a tread pattern having a designated rotational direction N. The rotational direction N is identified on its sidewall portion 3 (shown in FIG. 2) using characters, for example.

As shown in FIG. 2, the tread portion 2 has a relatively large curved ground contact surface 2a between a pair of tread edges 2t and 2t, which protrudes radially outward to obtain a sufficient ground contacting area during cornering with a large camber angle. The axial distance between the tread edges 2t and 2t is defined as a tread width TWa, and which corresponds to the axial maximum width of the tire. A developed length between the tread edges 2t and 2t is defined as a tread developed width TW.

The tire 1 further includes a pair of sidewall portions 3, a pair of bead portions 4 each with a bead core 5 therein, a carcass 6 extending between bead cores 5 through the tread portion 2 and the sidewall portions 3, and a tread reinforcing layer 7 disposed radially outwardly of the carcass 6 in the tread portion 2.

The carcass 6 includes one carcass ply 6A of carcass cords which includes a main portion 6a extending between the bead cores 5 and 5 through the tread portion 2 and the sidewall portions 3, and a pair of turn-up portions 6b each turned up around the bead core 5 from axially inside to outside of the tire.

The carcass cords are arranged at an angle in a range of from 75 to 90 degrees with respect to a tire equator C. For the carcass cords, organic fiber cords, e.g. polyester, nylon, rayon, and the like may preferably be used. A bead apex rubber 8 that extends and tapers radially outwardly of the tire from the bead core 5 is provided between the main portion 6a and the turn-up portion 6b in each bead portion 4.

The tread reinforcing layer 7 includes at least one, preferably two belt plies 7A and 7B of high modulus belt cords laid at an angle of from 5 to 40 degrees with respect to the tire equator C so that each belt cord of plies is crossed. For the belt cords, steel, aramid, or rayon cords may preferably be used.

As shown in FIG. 1, the tread portion 2 in accordance with the present embodiment includes a central region Ca, a pair of middle regions Ma, and a pair of shoulder regions Sa.

The central region Ca of the tread portion 2 is a region that has its center on the tire equator C and has its developed width of one third of the tread developed width TW. The central region Ca of the tread portion 2 mainly comes into contact with the road during traveling straight ahead.

Each shoulder region Sa is a region that has its developed width of one sixth of the tread developed width TW from the tread edge Te. The shoulder region Sa of the tread portion 2 mainly comes into contact with the road during the final stage of cornering.

Each middle region Ma is a region between the central region Ca and the shoulder region Sa. The middle region Ma of the tread portion 2 mainly comes into contact with the road during the early stage of cornering.

The tread portion 2 is provided with a plurality of first inclined grooves 10, a plurality of second inclined grooves 11, and a circumferentially and continuously extending center longitudinal groove 12.

Each first inclined groove 10 extends from the central region Ca to the shoulder region Sa, while inclining at angle with respect to the circumferential direction of the tire. Such a first inclined groove may improve ride comfort by decreasing the rigidity of the tread portion 2 in a wide area.

In this embodiment, the first inclined groove 10 extends beyond the tread edge 2t so that its axially outer 10s (shown in FIG. 2) is positioned axially outside of the tread edge 2t. Thus, such a first inclined groove may further improve ride comfort by decreasing the rigidity of the sidewall portion 3.

The first inclined groove 10 includes a first tapered portion 14, and a main portion 15 having a substantially constant groove width leading to the first tapered portion 15.

The first tapered portion 14 has a groove width decreasing toward the rotational direction N of the tire. Such a first tapered portion 14 may offer rigidity around the first tapered portion 14 that gradually changes. Thus, an impact inputted into the tread portion 2 at the time when the first inclined groove 10 comes into contact with the road may be reduced, thereby further improving ride comfort.

The first tapered portion 14 includes a portion that has a relatively large decreasing ratio of the groove width compared to the other portion of the first inclined groove 10. In this embodiment, the first tapered portion 14 is formed by locally bending its one groove edge 10a toward the other groove edge 10b. Here, the groove width refers to a distance between two groove edges 10a and 10b measured perpendicular to the groove centerline 10c of the first inclined groove 10. The groove centerline 10c is defined as a centerline between groove edges 10a and 10b of the major part of the first inclined groove 14. In this embodiment, the groove centerline 10c is defined using the main portion 15. Namely, to define the groove centerline 10c of the first inclined groove 10, the groove edge 10a of the first inclined groove 10 may be regarded as a smooth line that includes an actual groove edge 10d and its extension 10e. Furthermore, the second tapered portion 17, the groove width, and the groove centerline of the second inclined groove 11 are defined same as the above.

The first tapered portion 14 is located in the central region Ca so as to form a forward of the first inclined groove 10 in the rotational direction N.

Figure 3:
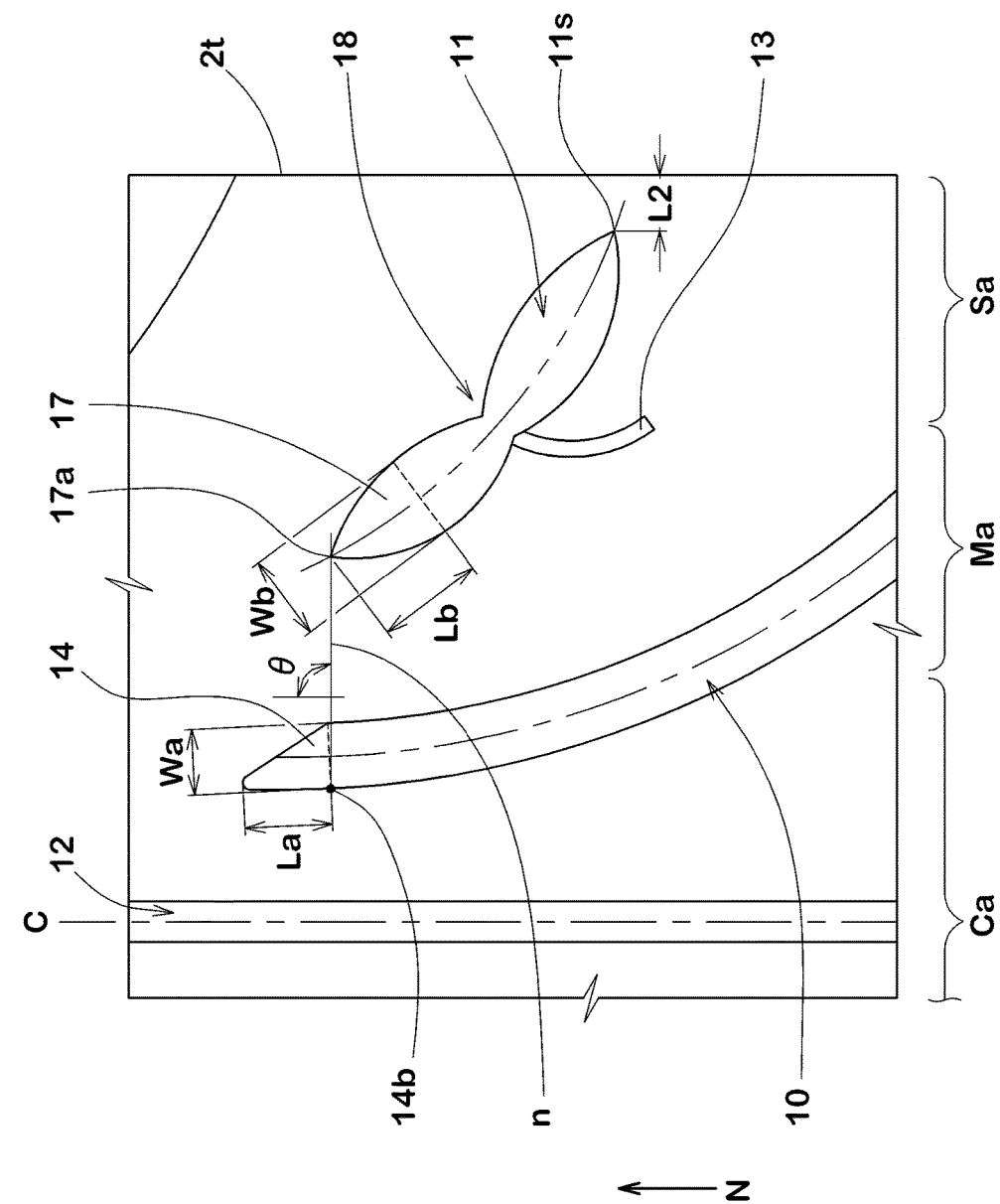
FIG. 3 is a partial enlarged view of a right pattern of the tread portion.

As shown in FIG. 3, the first tapered portion 14 of the first inclined groove 10 preferably has its length La larger than the maximum groove width Wa of the first tapered portion 14. When the length La of the first tapered portion 14 is less than the maximum groove width Wa of the first tapered portion 14, the rigidity in the circumferential direction around the first tapered portion 14 tends to rapidly change. When the length La of the first tapered portion 14 is excessively large with respect to the maximum groove width Wa of the first tapered portion 14, the tire might be offer uncomfortable ride due to a small groove area of the first inclined groove 10. Preferably, the first inclined groove 10 has the length La of the first tapered portion 14 in a range of from 1.1 to 1.4 times in relation to the maximum groove width Wa of the first tapered portion 14 of the first inclined groove 10. In the present specification and claims, the length La of the first tapered portion 14 refers to a length measured perpendicular to the maximum groove width Wa. Furthermore, the length of the second tapered portion 17 of the second inclined groove 11 is defined same as the above.

As shown in FIG. 1, the main portion 15 of the first inclined groove 10 extends from the central region Ca to the tread edge 2t in a smooth arc manner. Thus, each region Ca, Ma and Sa of the tread portion 2 may have high rigidity so that high wear resistance and better cornering stability is offered.

In this embodiment, the difference W1a−W1b between the maximum groove width W1a and the minimum groove width W1b of the main portion 15 is preferably set in a range of not more than 40% in relation to the maximum groove width W1a of the main portion 15 to further improve the advantages described above.

In this embodiment, the first inclined groove 10 has an angle α1 with respect to the circumferential direction of the tire, which is smoothly increasing toward axially outward. Thus, the first inclined groove 10 may help to increase the lateral rigidity of the shoulder region Sa to further improve cornering stability.

In order to further improve the advantages described above, the first inclined groove 10 preferably has an angle α1a at the tread edge 2t in a range of from 60 to 80 degrees with respect to the circumferential direction of the tire. The angle of the first inclined groove 10 is an angle of its groove centerline 10c with respect to the circumferential line of the tire.

In this embodiment, the first inclined grooves 10 include a right first inclined groove 10A that extends from the first tapered portion 14A positioned on the right side and in the vicinity of the tire equator C to the right tread edge 2ta, and a left first inclined groove 10B that extends from the first tapered portion 14B positioned on the left side and in the vicinity of the tire equator C to the left tread edge 2tb. The right first inclined groove 10A and the left first inclined groove 10B are alternately arranged in the circumferential direction of the tire.

In order to further improve ride comfort, cornering stability, and wear resistance, the first inclined groove 10 preferably has its groove depth D1 (shown in FIG. 2) in a range of from 3.0 to 7.0 mm. In the same way, the first inclined groove 10 preferably has its maximum groove width W1 in a range of from 3.0 to 9.0 mm. In addition, the first inclined groove 10 preferably has its circumferential groove length L1 in a range of from 40% to 90% in relation to the tread developed width TW.

The second inclined grooves 11 are arranged between circumferentially adjacent first inclined grooves 10 and 10 on each side of the tire equator C. Each second inclined groove 11 extends axially outward from the middle region Ma to the shoulder region Sa to maintain high rigidity of the central region Ca while softening the middle region Ma. Furthermore, the second inclined groove 11 is inclined at an angle with respect to the circumferential direction of the tire.

As shown in FIG. 3, the second inclined groove 11 has its axially outer 11s that terminates within the shoulder region Sa to maintain high rigidity around the tread edge 2t, thereby improving performance at the final stage of cornering.

In order to further improve the advantages described above while improving ride comfort, an axial distance L2 between the axially outer 11s of the second inclined groove 11 and the tread edge 2t is preferably set in a range of from 2% to 5% in relation to the tread developed width TW.

In this embodiment, the second inclined groove 11 includes a second tapered portion 17 and a narrow portion 18.

The second tapered portion 17 has a groove width Wb decreasing toward the rotational direction N of the tire. Such a second tapered portion 17 may offer rigidity around the second tapered portion 17 that gradually changes. Thus, an impact inputted into the tread portion 2 at the time when the second inclined groove 11 comes into contact with the road may be reduced, thereby further improving ride comfort.

In a pair of the first and second inclined grooves 11 and 17 that are arranged closest to each other, the second tapered portion 17 is located behind a forward of the first tapered portion 14 in the rotational direction N of the tire such that a straight line n connecting between a forward 17a of the second tapered portion 17 and a backward 14b of the first tapered portion 14 in the rotational direction N of the tire has an angle θ in a range of from 85 to 90 degrees with respect to the circumferential direction of the tire. Thus, since the rigidity of the tread portion 2 may be gradually changed in the circumferential direction of the tire, ride comfort may further be improved.

When the angle θ of the straight line n is less than 85 degrees, it might be difficult to be changed the rigidity smoothly in the circumferential direction of the tire around the first and second tapered portions 14 and 17 by approaching these ends one another in the circumferential direction of the tire.

In order to offer better ride comfort by reducing the circumferential rigidity change of the tread portion 2, the second tapered portion 17 of the second inclined groove 11 preferably has its groove length Lb greater than its maximum groove width Wb. More preferably, the second tapered portion 17 has the groove length Lb in a range of from 1.05 to 1.20 times in relation to its maximum groove width Wb.

In this embodiment, the second tapered portion 17 is provided within the middle region Ma so as to form the forward 17a of the second inclined groove 11 in the rotational direction N of the tire. Thus, ride comfort at the early stage of cornering may be improved.

The narrow portion 18 that locally decreases its groove width is arranged in a longitudinal middle region of the second inclined groove 11 to enhance the rigidity of the middle region Ma and the shoulder region Sa. The second inclined groove 11 also includes a tapered portion having a groove width smoothly decreasing toward the anti-rotational direction N of the tire as its backward of the second inclined groove 11. Thus, since the second inclined groove in accordance with the present embodiment may have a two-leaf shape, the rigidity of the shoulder region Sa may further be enhanced. Thus, the tire may exhibit better cornering performance.

As shown in FIG. 2, the narrow portion 18 preferably has a shallow bottom part 19 having a groove depth D3 smaller than the maximum groove depth D2 of the second inclined groove 11. This shallow bottom part 19 may help to enhance the rigidity of middle region Ma.

The groove depth D3 of the shallow bottom part 19 is preferably set in a range of from 20% to 60% in relation to the maximum groove depth D2 of the second inclined groove 11. The maximum groove depth D2 of the second inclined groove 11 is preferably set in a range of from 90% to 100% in relation to the groove depth D1 of the first inclined groove 10.

As shown in FIG. 1, the second inclined groove 11 preferably has its circumferential length L4 in a range of from 15% to 45% in relation to the tread developed width TW and its axial length L5 in a range of from 10% to 30% in relation to the tread developed width TW in order to offer better performance with respect to wear resistance, cornering, and ride comfort.

The center longitudinal groove 12 is provided between the first tapered portion 14A of the right first inclined groove 10A and the first tapered portion 14B of the left first inclined groove 10B. The center longitudinal groove 12 may help to suitably soften the rigidity of the central region Ca so that the ride comfort during traveling straight ahead is improved. Preferably, the center longitudinal groove 12 straightly extends on the tire equator C in order to keep a symmetrical rigidity of the tread portion 2 that offers stably cornering performance.

In order to further improve the advantages described above, the center longitudinal groove 12 preferably has its groove width W4 in range of from 2.0 to 5.0 mm and its groove depth D4 (shown in FIG. 2) in a range of from 4.0 to 6.0 mm.

In this embodiment, the tread portion 2 is further provided with a narrow groove 13 that has one end 13a being communicated with the second inclined groove 11 and the other end 13b terminating without communicating with other grooves. In this embodiment, the other end 13b of the narrow groove 13 terminates in the vicinity of axially outward end Me of the middle region Ma. The narrow groove 13 extends in an arc fashion with a small groove width W5. Preferably, the narrow groove 13 has the groove width W5 in a range of from 0.7 to 2.0 mm and the groove depth in a range of from 0.5 to 1.5 mm to improve ride comfort while maintaining cornering stability.

The central region Ca, the middle region Ma, and the shoulder region Sa of the tread portion 2 have land ratios of Rc, Rm and Rs, respectively. The land ratios preferably satisfy the following relation:

Rs>Rm>Rc.

Better ride comfort during traveling straight ahead may be obtained by minimizing the land ratio Rc of the central region Ca among the respective land ratios. In addition, excellent cornering stability may be obtained by maximizing the land ratio Rs of the shoulder region Sa among the respective land ratios.

The land ratios of Rc, Rm and Rs is a ratio A1/A2 in each region of a net ground contacting area "A1" to a gross ground contacting area "A2" that includes the all grooves 10 to 13.

Preferably, the land ratios Rc, Rm, and Rs are set in a range of from 0.80 to 0.90. When the land ratios Rc, Rm, and Rs are less than 0.80, wear-resistance may be deteriorated owing to the low tread rigidity. When the land ratios Rc, Rm, and Rs are more than 0.90, ride comfort may be deteriorated during traveling owing to the high tread rigidity. More preferably, the land ratios Rc, Rm, and Rs are set in a range of from 0.81 to 0.85.

In this embodiment, the tread pattern of the tread portion 2 comprises a left pattern, and a right pattern, wherein the left pattern has a symmetrical design of the right pattern with respect to the tire equator C. Furthermore, the left pattern is preferably arranged to be shifted with respect to the right pattern in a circumferential length of the tire. Thus, better wear resistance of the tire as well as excellent cornering-stability may be obtained owing to a symmetrical lateral rigidity of the tread portion 2.

Preferably, the circumferential difference between the left tread pattern and the right tread pattern is about a half of the pitch P of the tread pattern. Here, the pitch P is preferably set in a range of from 55% to 75% in relation to the tread developed width TW.

While the particularly preferable embodiments of the present invention have been described in detail, the present invention in not limited to the illustrated embodiments, but can be modified and carried out in various aspects.

Comparison Test

To confirm the advantage of the present invention, the motorcycle tires (90/90-1050J) shown in FIG. 1 and Table 1 were manufactured and tested. The details of test tires and test methods are as follows.

Details of test tires:
  Tread developed width TW: 111 mm
  First inclined groove depth: 5.5 mm
  Second inclined groove maximum depth: 5.2 mm
  Shallow bottom part depth: 2.7 mm
  Center longitudinal groove depth: 5.5 mm
  Narrow groove depth: 1.0 mm Cornering stability and Ride comfort test:
  Each test tire was installed in a motorcycle having 50 cc displacement as its front and rear wheels under the below condition. Then, a test driver drove the motorcycle on a dry asphalt road, and evaluated the cornering performance and ride comfort by his feeling. The test results were evaluated using a score based on Ref. 1 being 100 in Table 1. The larger the score, the better the performance is.
  Rim: MT2.15×10
  Internal pressure: Front 125 kPa/Rear 200 kPa Wear resistance test:
  After the cornering stability and ride comfort test, the test driver further drove the motorcycle in 200 km, and then measured the groove depth left on the first and second inclined grooves at eight points in the circumferential direction of the tire. The test results were indicated using an index based on Ref. 1 being 100 in Table 1. The larger the index, the better the performance is.

The test results are shown in Table 1. As shown in Table 1, it is confirmed that the tire in accordance with the present invention exhibits better performance with respect to ride comfort and wear resistance.

TABLE 1-1

| | Ref. 1 | Ex. 1 | Ex. 2 | Ex. 3 | Ex. 4 | Ex. 5 | Ref. 2 | Ref. 3 |
|---|---|---|---|---|---|---|---|---|
| First inclined groove | | | | | | | | |
| Position of forward end | Ca | Ca | Ca | Ca | Ca | Ca | Ma | Ca |
| Position of backward end | Sa | | | Outside of tread edge | | | | Ma |
| Ratio La/Wa | 0.4 | 1.2 | 0.5 | 1.1 | 1.4 | 1.5 | 1.2 | 1.2 |
| Second inclined groove | | | | | | | | |
| Position of forward end | Ma | Ma | Ma | Ma | Ma | Ma | Ma | Ma |
| Position of backward end | Outside of tread edge | Sa | Sa | Sa | Sa | Sa | Sa | Sa |
| Ratio Lb/Wb | 0.6 | 1.1 | 0.5 | 1.05 | 1.2 | 1.3 | 1.1 | 1.1 |
| Land ratio of central region Rc (%) | 79 | 81 | 83 | 81.5 | 80.5 | 79.5 | 81 | 81 |
| Land ratio of middle region Rm (%) | 84 | 83 | 85 | 83.5 | 82.5 | 81.5 | 83 | 85 |
| Land ratio of shoulder region Rs (%) | 87 | 84 | 84 | 84 | 84 | 84 | 84 | 95 |
| Angle θ of straight line n (deg.) | 2 | 90 | 90 | 90 | 90 | 90 | 90 | 90 |
| Center longitudinal groove | Provided | Provided | Provided | Provided | Provided | Provided | Provided | Provided |
| Tread pattern | FIG. 1 | FIG. 1 | FIG. 1 | FIG. 1 | FIG. 1 | FIG. 1 | FIG. 1 | FIG. 1 |
| Wear resistance [Index] | 100 | 110 | 115 | 110 | 105 | 100 | 120 | 105 |
| Cornering stability [Score] | 100 | 110 | 95 | 105 | 105 | 100 | 90 | 85 |
| Ride comfort [Score] | 100 | 110 | 95 | 105 | 115 | 120 | 90 | 80 |
| Total | 300 | 330 | 305 | 320 | 325 | 320 | 300 | 270 |

TABLE 1-2

Figure 4A:
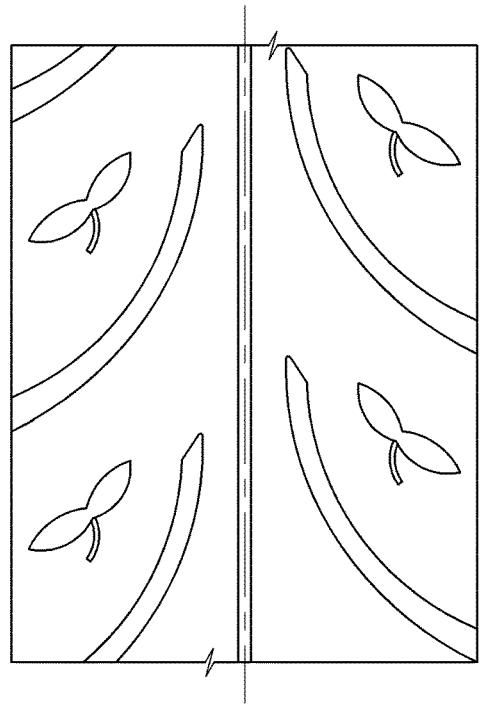
FIGS. 4A and 4B are development views each illustrating a tread portion in accordance with other embodiments of the present invention.
Figure 4B:
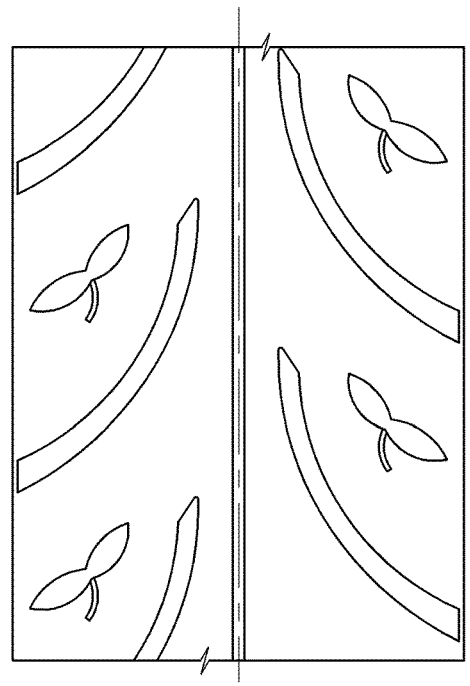

|  | Ref. 4 | Ref. 5 | Ex. 6 | Ref. 6 | Ref. 7 | Ex. 7 | Ex. 8 | Ex. 9 |
|---|---|---|---|---|---|---|---|---|
| First inclined groove | | | | | | | | |
| Position of forward end | Ca | Ca | Ca | Ca | Ca | Ca | Ca | Ca |
| Position of backward end | | | | Outside of tread edge | | | | Sa |
| Ratio La/Wa | 1.2 | 1.2 | 1.2 | 1.2 | 1.2 | 1.2 | 1.2 | 1.2 |
| Second inclined groove | | | | | | | | |
| Position of forward end | Ca | Ma | Ma | Ma | Ma | Ma | Ma | Ma |
| Position of backward end | Sa | Ma | Outside of tread edge | Sa | Sa | Sa | Sa | Sa |
| Ratio Lb/Wb | 1.1 | 1.1 | 1.1 | 1.1 | 1.1 | 1.1 | 1.1 | 1.1 |
| Land ratio of central region Rc (%) | 81 | 81 | 81 | 81 | 81 | 82 | 81 | 81 |
| Land ratio of middle region Rm (%) | 83 | 83 | 83 | 83 | 83 | 83 | 83 | 83 |
| Land ratio of shoulder region Rs (%) | 84 | 95 | 82 | 84 | 84 | 84 | 84 | 86 |
| Angle θ of straight line n (deg.) | 90 | 90 | 90 | 80 | 100 (*) | 90 | 90 | 90 |
| Center longitudinal groove | Provided | Provided | Provided | Provided | Provided | Absence | Provided | Provided |
| Tread pattern | FIG. 1 | FIG. 1 | FIG. 1 | FIG. 1 | FIG. 1 | FIG. 1 | FIG. 4A | FIG. 4B |
| Wear resistance [Index] | 90 | 110 | 110 | 110 | 110 | 115 | 105 | 110 |
| Cornering stability [Score] | 90 | 90 | 95 | 90 | 90 | 105 | 105 | 110 |
| Ride comfort [Score] | 115 | 90 | 110 | 100 | 100 | 105 | 115 | 100 |
| Total | 295 | 290 | 315 | 300 | 300 | 325 | 325 | 320 |

(*) The backward end of first tapered portion is located behind the forward end of the second tapered portion.

What is claimed is:

1. A motorcycle tire comprising;
a tread portion having a designated rotational direction,
the tread portion comprising a central region having its center on a tire equator and having a developed width of one third of a tread developed width, a pair of shoulder regions each having a developed width of one sixth of the tread developed width from a tread edge, and a pair of middle regions each between the central region and the middle region,
the tread portion being provided with a plurality of first inclined grooves each extending from the central region to one of the shoulder regions, and a plurality of second inclined grooves each extending from the middle region to the shoulder region between circumferentially adjacent first inclined grooves,
each first inclined groove comprising a main portion, and a first tapered portion having a groove width decreasing toward the rotational direction of the tire,
each second inclined groove comprising a second tapered portion having a groove width decreasing toward the rotational direction of the tire and a narrow portion of locally decreased groove width that is arranged in a longitudinal middle region of the second inclined groove, wherein each second inclined groove comprises a pair of groove edges, each of the pair of groove edges consisting of a pair of adjacent convex curves each arranged to protrude away from a groove centerline of the second inclined groove, and
wherein in a pair of the first and second inclined grooves that are arranged closest to each other, the second tapered portion is located behind a forward end of the first tapered portion in the rotational direction of the tire such that a straight line connecting between a forward end of the second tapered portion and a backward end of the first tapered portion has an angle in a range of from 85 to 90 degrees with respect to a circumferential direction of the tire.

2. The motorcycle tire according to claim 1, wherein the first inclined grooves extend beyond the tread edge.

3. The motorcycle tire according to claim 1, wherein the central region, the middle regions, and the shoulder regions have land ratios of Rc, Rm and Rs, respectively, and the land ratios satisfy the following relation:

Rs>Rm>Rc.

4. The motorcycle tire according to claim 1, wherein the central region, the middle regions, and the shoulder regions have land ratios of Rc, Rm and Rs, respectively, and the land ratios Rc, Rm and Rs are set in a range of from 0.8 to 0.9.

5. The motorcycle tire according to claim 1,
wherein the first tapered portion of the first inclined groove has a length larger than a maximum groove width of the first tapered portion, and
the second tapered portion of the second inclined groove has a length larger than a maximum groove width of the second tapered portion.

6. The motorcycle tire according to claim 1,
wherein the first inclined grooves comprise a left first inclined groove, and a right first inclined groove, each having the first tapered portion in the vicinity of the tire equator, and
the tread portion is further provided with a circumferentially extending central longitudinal groove disposed between the left first inclined groove and the right first inclined groove.

7. The motorcycle tire according to claim 1, wherein a tread pattern of the tread portion comprises a left pattern, and a right pattern, the left pattern has a symmetrical design of the right pattern with respect to the tire equator, and the left pattern is arranged to be shifted with respect to the right pattern in a circumferential length of the tire.

8. A motorcycle tire comprising:
a tread portion having a designated rotational direction,
the tread portion comprising a central region having its center on a tire equator and having a developed width of one third of a tread developed width, a pair of shoulder regions each having a developed width of one sixth of the tread developed width from a tread edge and a pair of middle regions each between the central region and the middle region;
the tread portion provided with a plurality of first inclined grooves each extending from the central region to one of the shoulder regions, and a plurality of second inclined grooves each extending from the middle region to the shoulder region between circumferentially adjacent first inclined grooves;

each first inclined groove comprising a main portion and a first tapered portion having a groove width decreasing toward the rotational direction of the tire;

each second inclined groove comprising a second tapered portion having a groove width decreasing toward the rotational direction of the tire and a narrow portion of locally decreased groove width and that is arranged in a longitudinal middle region of the second inclined groove, wherein only a single narrow groove is connected to the respective second inclined groove; and in a pair of the first and second inclined grooves that are arranged closest to each other, the second tapered portion being located behind a forward end of the first tapered portion in the rotational direction of the tire such that a straight line connecting between a forward end of the second tapered portion and a backward end of the first tapered portion has an angle in a range of from 85 to 90 degrees with respect to a circumferential direction of the tire.

9. The motorcycle tire according to claim 8, wherein the narrow groove is in communication with the narrow portion of the second inclined groove.

10. The motorcycle tire according to claim 8, wherein the narrow groove has the other end terminated without communicating with any other groove.

11. The motorcycle tire according to claim 8, wherein the at least one narrow groove extends in an arc fashion.

12. The motorcycle tire according to claim 8, wherein the narrow groove protrudes toward the tire equator, and wherein each first inclined groove is curved to protrude in a same direction as the narrow groove.

* * * * *